United States Patent
Tabanelli

(10) Patent No.: US 8,591,217 B2
(45) Date of Patent: Nov. 26, 2013

(54) BELLING MACHINE FOR FORMING SOCKETS ON THE ENDS OF PIPES MADE OF THERMOPLASTIC MATERIAL AND METHOD OF FORMING A SOCKET AT THE END OF A PIPE MADE OF THERMOPLASTIC MATERIAL

(75) Inventor: Giorgio Tabanelli, Cotignola (IT)

(73) Assignee: Sica S.p.A., Alfonsine (IT)

( * ) Notice: Subject to any disclaimer, the term of this patent is extended or adjusted under 35 U.S.C. 154(b) by 0 days.

(21) Appl. No.: 13/528,967

(22) Filed: Jun. 21, 2012

(65) Prior Publication Data
US 2012/0282365 A1 Nov. 8, 2012

Related U.S. Application Data

(62) Division of application No. 12/616,400, filed on Nov. 11, 2009.

(30) Foreign Application Priority Data

Nov. 20, 2008 (EP) ..................................... 08425739

(51) Int. Cl.
*B29C 51/10* (2006.01)
*B29C 51/42* (2006.01)

(52) U.S. Cl.
USPC ........... 425/384; 425/86; 425/387.1; 425/393

(58) Field of Classification Search
USPC ............ 264/237, 322, 348, 500; 425/86, 384, 425/387.1, 393
See application file for complete search history.

(56) References Cited

U.S. PATENT DOCUMENTS

| 3,849,052 A | 11/1974 | Gordon |
| 4,091,059 A | 5/1978 | Ryder |
| 4,266,926 A | 5/1981 | Gordon |
| 4,277,231 A | 7/1981 | Gordon |
| 4,353,860 A | 10/1982 | Gordon |
| 4,545,951 A | 10/1985 | Gordon |
| 5,292,824 A | 3/1994 | Nagai et al. |
| 5,620,719 A | 4/1997 | Savioli |
| 5,855,930 A | 1/1999 | Savioli |

FOREIGN PATENT DOCUMENTS

| EP | 0516595 A1 | 12/1992 |
| EP | 0561594 A2 | 9/1993 |
| EP | 0684124 A1 | 11/1995 |
| EP | 0700771 A | 3/1996 |
| IT | 1169179 B | 5/1987 |

*Primary Examiner* — Ryan Ochylski
(74) *Attorney, Agent, or Firm* — Pearne & Gordon LLP

(57) ABSTRACT

In a belling machine and in a method of forming a socket at the heated end of a pipe, an end of a pipe made of thermoplastic material on which a socket is to be formed is heated until it is in a deformable state, inserted in a forming chamber and formed into a socket shape. Process air, taken from a compressed air source, is conveyed into an evaporator of a refrigerating machine using a refrigerant recirculating in a closed circuit and passes through the evaporator, resulting in transfer of heat from the process air to the refrigerant inside the evaporator. The process air is then conveyed to the forming chamber through an inlet, at least to cool the material of the end of the pipe at least by means of a process air flow inside the forming chamber.

8 Claims, 4 Drawing Sheets

BELLING MACHINE FOR FORMING SOCKETS ON THE ENDS OF PIPES MADE OF THERMOPLASTIC MATERIAL AND METHOD OF FORMING A SOCKET AT THE END OF A PIPE MADE OF THERMOPLASTIC MATERIAL

BACKGROUND OF THE INVENTION

The present invention relates to a belling machine for forming sockets on the ends of pipes made of thermoplastic material. The invention also relates to a method of forming a socket at the end of a pipe made of thermoplastic material.

In particular, the present invention relates to a belling machine and a method of forming which use specific cooling of the socket formed.

In pipes made of thermoplastic material one of the most widespread systems for making the joint between two pipes is the "socket" system. It consists of forming a socket at one of the two ends of a pipe, then inserting into the socket thus formed the end of another pipe which has not had a socket formed on it.

The sockets at the end of the pipes are made using a thermoforming process by a suitable belling machine. The belling machine is normally installed downstream of a pipe extrusion line and receives from the latter the cut pipes to be machined. Belling machines usually comprise a machining head equipped with at least one oven for heating the end of the pipe on which the socket must be formed, and a forming station which uses a suitable mould to form the heated end of the pipe into a socket. The socket is also usually cooled in the forming station. Cooling may take place simultaneously with and/or after socket forming. When the socket has reached a temperature close to ambient temperature, the socket is removed from the mould and the pipe which has already undergone the belling process is unloaded from the machine. The most widespread belling techniques use compressed air which, introduced into an environment which can be pressurised, has a fluidic action, pressing the walls of the end of the pipe, which are heated and plastically deformable, against a metal mould.

The metal moulds may form the outer shape of the socket. In this case the mould is made on the inner walls of a cavity, in which the end of the pipe on which the socket is to be formed is inserted. The compressed air is introduced into the pipe and pushes the walls of the end of the pipe from the inside towards the outside against the inner walls of the cavity. If the final shape of the socket requires the presence of an annular seat for a seal, a corresponding annular groove is made on the inner walls of the cavity which forms the mould.

The metal moulds may form the inner shape of the socket. In this case, the mould is configured like a mandrel (or plug) and in particular consists of the outer lateral walls of the mandrel. The mandrel is positioned inside a cavity which can be pressurised and is forced axially into the end of the pipe. The compressed air is introduced into the cavity which can be pressurised outside the pipe (and the mandrel) and pushes the walls of the end of the pipe from the outside towards the inside against the outer walls of the mandrel. If the final shape of the socket requires the presence of an annular seat for a seal, the mandrel is equipped with expandable sectors located in the zone corresponding to the seal seat. Once the seal seat has been formed, said expandable sectors are retracted inside the mandrel before the mandrel is removed from the end of the pipe on which the socket has been formed. Systems which use this type of mould are described, for example, in patent documents IT 1 169 179, EP 0 516 595 and EP 0 684 124.

The metal moulds may form both the inner shape and the outer shape of the socket. In this case the configuration of the mould is a combination of the two cases described above: a mandrel, whose outer lateral surfaces form the inner shape of the socket, is inserted in a cavity which can be pressurised whose inner lateral surfaces form the outer shape of the socket. The mandrel is then forced coaxially into the end of the pipe on which the socket is to be formed. Then, during a first step the compressed air is introduced into the pipe and pushes the walls of the end of the pipe from the inside towards the outside against the inner walls of the cavity. During a second step, after the space between the mandrel and the pipe has been at least partly depressurised, the compressed air is introduced into the cavity which can be pressurised outside the pipe (and the mandrel) and pushes the walls of the end of the pipe from the outside towards the inside against the outer walls of the mandrel. An example of this type of system is described in patent document EP 0 700 771.

The socket can normally be cooled by making a flow of cooling fluid directly strike the walls of the pipe and, therefore, using forced convection phenomena. Alternatively or in addition, the socket may also be cooled by removing heat from the socket by conduction through the metal walls of the mould. In particular, for the purpose of the latter, the mould may in turn be cooled by circulating cooling fluids inside it. In the case of systems which use mechanical mandrels equipped with expandable sectors for forming the seal annular seat, the presence in the mandrel of complex mechanisms dedicated to the movement of the expandable sectors makes cooling of the inside of the mandrel by circulating coolants impracticable.

A forced air flow is often used as the cooling fluid and, using a separate circuit, compressed air is used for the socket forming process. An example of this type of belling machine is found in patent document IT 1 169 179. During forming, while the compressed air is introduced into the forming chamber through a relative inlet, the forced cooling air flow is introduced into the mandrel to cool the latter. When forming is complete, the supply of compressed air is stopped and the forced cooling air flow is introduced into the chamber through a different inlet to that of the compressed air.

In an alternative embodiment of this system, described in patent document EP 0 561 594, at the end of forming, the low pressure forced air flow continues to be introduced into the mandrel, whilst the supply of compressed air is not stopped, but instead it is allowed to exit the forming chamber, so that its flow, continuously renewed, cools the outer surface of the socket just formed. The same process air used for forming the socket is therefore used to cool it.

Another example of a system in which the same process air is used both for forming and for cooling is described in patent document EP 0 684 124. In this system the only process air used is the compressed air for forming the socket. It is introduced into the forming chamber through a relative inlet and pressurises the chamber to a predetermined pressure level, forming the socket on the forming mandrel. Once the predetermined maximum pressure level has been reached and forming is complete, an outlet valve is opened, allowing the compressed air to exit the forming chamber through an outlet duct which leads into the mandrel. The inflow of compressed air is simultaneously maintained. This creates an air flow which cools the socket and which is then directly introduced into the mandrel, also helping to cool the mandrel. The air is then made to exit the mandrel through suitable outlet holes and is dispersed in the environment.

As already indicated, the systems described in patent documents IT 1 169 179, EP 0 516 595 and EP 0 684 124 (and briefly outlined above) use a mould consisting of a mandrel with a shaped exterior, inserted in a cavity which can be pressurised. During the forming step, the forming chamber is pressurised so as to minimise (or even eliminate) leaks of the compressed air introduced into it. During the cooling step after forming, part of the process air is allowed to exit the forming chamber although introduction of the process air into the chamber continues, so as to establish a flow of continuously changed air on the socket formed. The air exiting the chamber, if it does not contain too much moisture, can be collected and introduced into the mandrel to help to cool the latter (and, therefore, to cool the inner surface of the socket).

Belling machine performance, in terms of pieces produced per unit of time, is affected by the time for which the pipe remains in the forming and cooling station. The shorter the forming and cooling cycle is, the faster and more productive the machine is. The forming and cooling techniques are selected based on a suitable compromise between maximising the production speed and minimising the cost and complexity of the devices and of the components necessary to achieve the result.

The compressed air used in the socket forming and cooling processes is usually taken from the normal air distribution networks present in factories, distribution networks in which the air is usually available at a pressure of between 5 bar and 7 bar. Sometimes the air is taken directly from the environment surrounding the belling machine and is sent to the latter by a compressor suitably installed on the machine. The temperature and moisture content of the compressed air which is made available in this way are greatly affected by the environmental conditions and by the features of the compressed air generation and treatment system of the factory distribution network (or the compressor located on the machine).

It is particularly important to introduce air at a suitably low temperature into the forming and cooling devices, since the air temperature is directly correlated to the speed at which the process for cooling the socket formed takes place. In this context, air from the factory distribution network (or from the compressor located on the machine) must usually be treated, that is to say cooled, so that it reaches and stably remains at a temperature level low enough to guarantee an effective cooling process. The temperature of the compressed air obtained from the network or from the compressor is usually too high to be used directly in the socket cooling processes. Moreover, the thermal state of the compressed air obtained from the network or from the compressor is quite variable and difficult to estimate when designing the belling machine. The thermal state of the compressed air is affected by the configuration and efficiency of the factory compressor systems and by the temperature and moisture of the environment.

The normal cooling techniques for fluids involved in forming processes (in particular compressed air) usually use a refrigerating system outside the belling machine, which supplies in a closed cycle, using a recirculating pump, a water-based cooled heat exchange liquid (usually a solution of ethylene glycol in water). The cooled heat exchange liquid, arriving from the refrigerator, is circulated inside heat exchange devices designed to cool the fluids (in particular, the forced air flow and the compressed air) involved in the socket forming and cooling process. Where the configuration of the forming moulds allow and require it, the cooled heat exchange liquid arriving from the refrigerator is also circulated inside the socket forming moulds.

The conventional technique for cooling line compressed air, which is used in the socket forming and cooling process, is characterised by the use of tube bundle heat exchangers, in which there circulates the cooled heat exchange liquid arriving from and recirculated by the refrigerating system. The process air to be cooled is conveyed in these heat exchangers in such a way that it strikes the walls of the tubes in which the heat exchange liquid circulates, transferring heat to the latter.

When the cooling system to be integrated on the belling machine is being designed, it is necessary to size these refrigerators and heat exchangers in such a way that a suitable compromise is reached between the effectiveness of the cooling process obtained and the costs and dimensions of the cooling system. In order for the costs and dimensions of cooling systems to be sustainable at an industrial level, the refrigerators and heat exchangers designed end up with a series of insurmountable operating and performance limits, listed in detail below. It must first be stated that, in this context and in the description and claims, unless explicitly stated otherwise, when referring to air temperature values at a point where the air is moving at a predetermined speed and in a directed flow, reference is made to the temperature measurement obtained by inserting the sensitive element of a suitable thermometer in the flow.

It is practically impossible to obtain a compressed air temperature lower than 13° C. at the forming device inlet. Temperatures between 15° C. and 20° C. are normally obtained.

When the environmental thermal conditions and/or the temperature of the compressed air to be treated in the heat exchanger vary significantly, it is difficult to make the compressed air at the forming device inlet stably maintain a temperature below 20° C.

The conventional cooling systems described above do not allow a reduction of the moisture present in the compressed air. If the moisture in the air exceeds a predetermined threshold, problems may arise during the forming process, when the end of the pipe to be formed into a socket is very hot. In these conditions, the surface of the pipe may alter in an unacceptable way if it makes contact with the moisture in the air.

SUMMARY OF THE INVENTION

The present invention has for an aim to overcome the above-mentioned disadvantages, by providing a belling machine for forming sockets on the ends of pipes made of thermoplastic material and a method of forming a socket at the end of a pipe made of thermoplastic material which allow the socket to be cooled effectively and rapidly at the end of the forming process.

The present invention also has for an aim to provide a belling machine for forming sockets on the ends of pipes made of thermoplastic material and a method of forming a socket at the end of a pipe made of thermoplastic material which allow the socket to be cooled effectively and rapidly at the end of the forming process at costs which are sustainable at industrial level and with high productivity.

Accordingly, the present invention achieves these aims and others, more apparent in the description below, with a belling machine for forming sockets on the ends of pipes made of thermoplastic material and a method of forming a socket at the end of a pipe made of thermoplastic material, each having the structural and functional features described in the respective appended independent claims, the appended dependent claims describing other embodiments.

BRIEF DESCRIPTION OF THE DRAWINGS

The invention is described in more detail below, with reference to the accompanying drawings, which illustrate a preferred, non-limiting embodiment of the invention, and in which.

DESCRIPTION OF THE PREFERRED EMBODIMENTS

Figure 1:
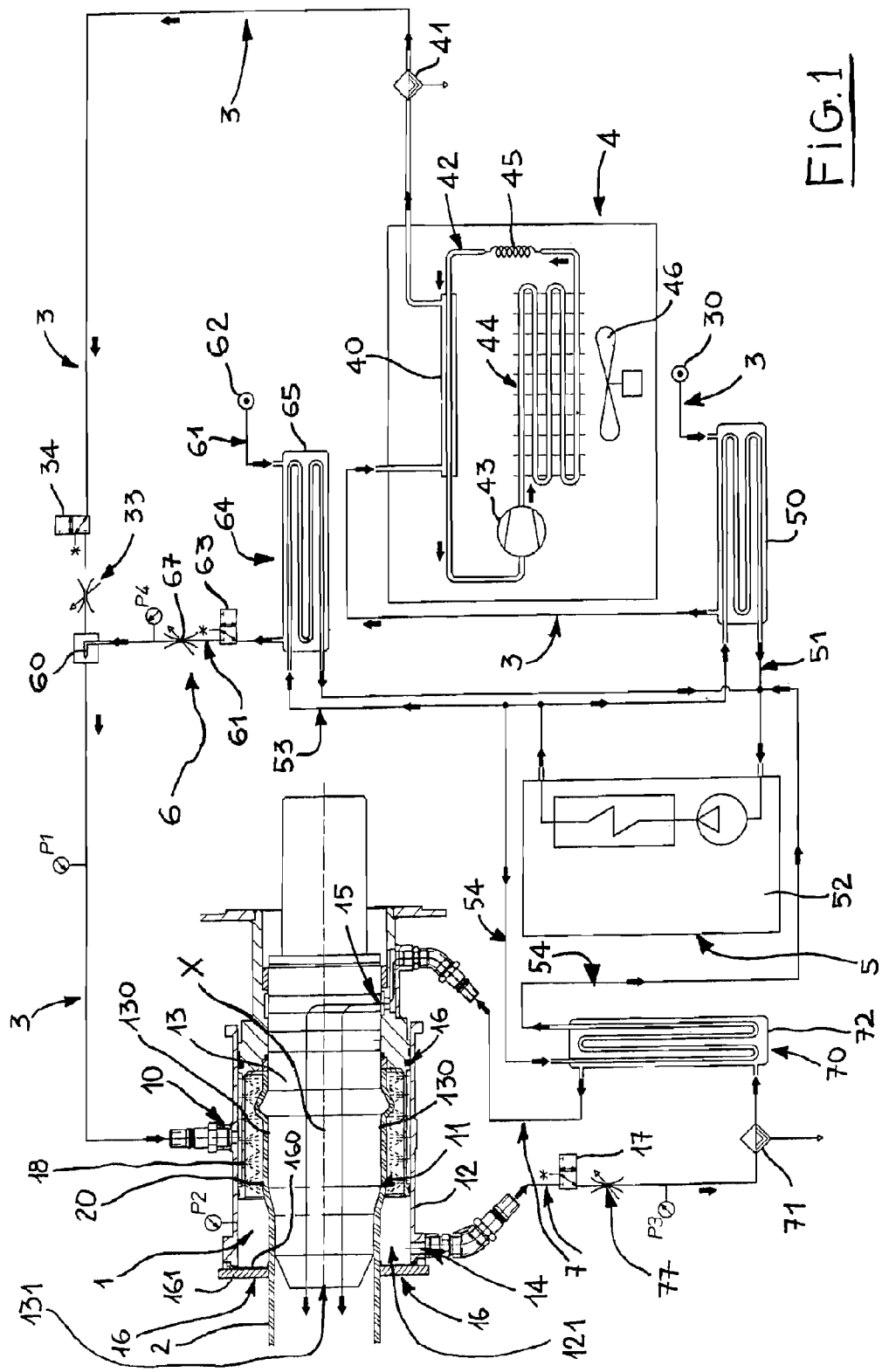
FIG. 1 is an overview diagram of an embodiment of the belling machine in accordance with the invention, having the process air treatment system, used to implement an embodiment of the forming method in accordance with the invention.
Figure 3:
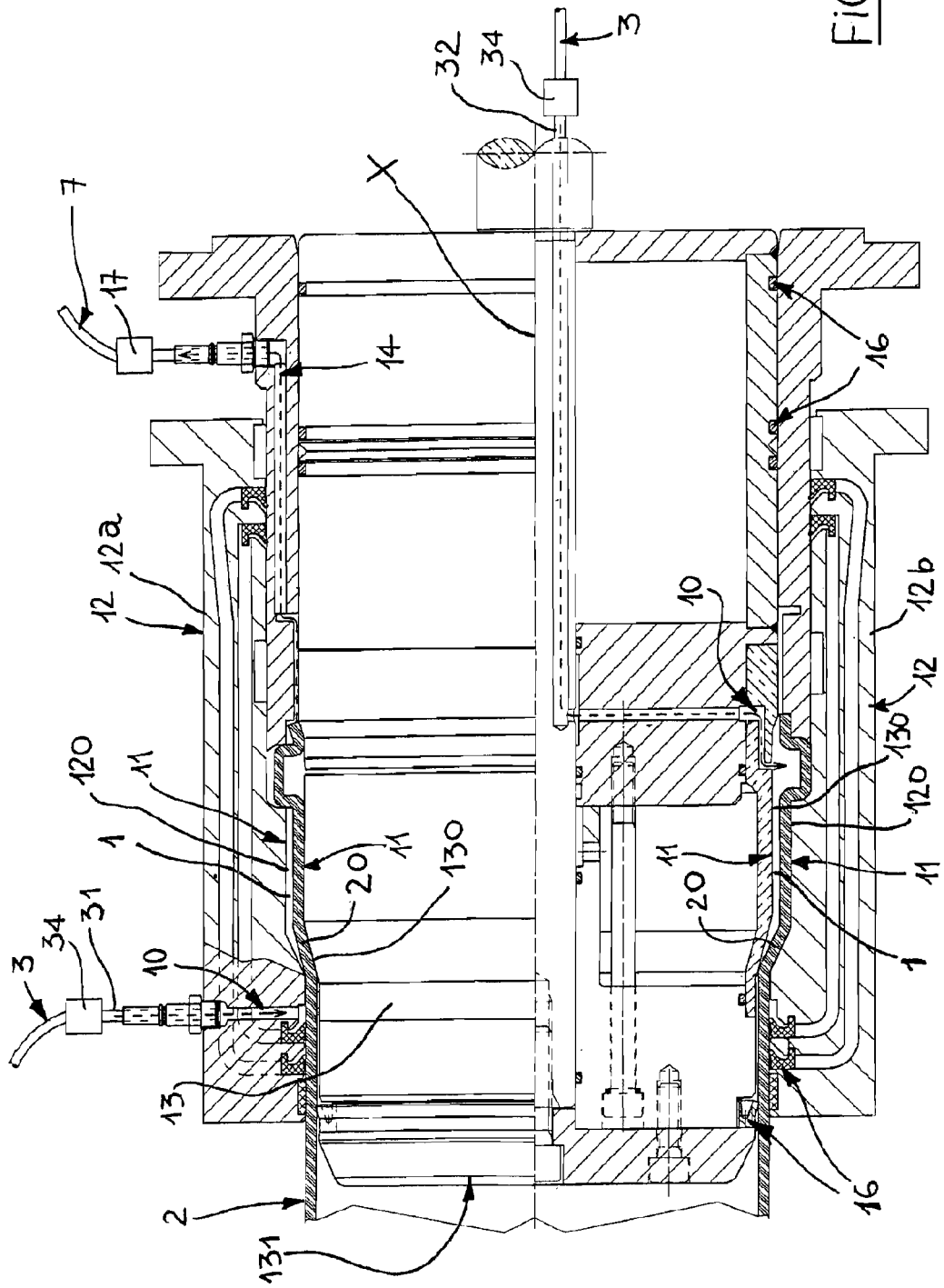
FIG. 3 is a view, partly in cross-section, of the detail of another embodiment of the belling machine forming chamber in accordance with the invention, implementing another embodiment of the forming method in accordance with the invention.

With reference in particular to FIG. 1, a belling machine for forming sockets on the ends of pipes made of thermoplastic material comprises a forming chamber 1, for the insertion and forming of a socket on the heated end 20 of a pipe 2 made of thermoplastic material on which a socket is to be formed. The end 20 of the pipe 2 is heated in an oven of the known type and not illustrated. The machine also comprises a process air feed line 3, which takes the process air from a compressed air source 30 and introduces the process air into the forming chamber 1 through an inlet 10. The compressed air source 30 may be a compressor mounted directly on the machine. The compressor may take air either from a feed line, or directly from the surrounding environment. The source 30 may also be a compressed air distribution line made and/or available in the factory in which the belling machine is installed. The pressure of the compressed air taken from the source is regulated so that it is at a predetermined value between 5 bar and 10 bar. The process air feed line 3 comprises means for stopping the inflow of process air from the compressed air source 30, which can preferably be remote controlled (for example one or more on-off valves). The process air feed line 3 comprises a flow rate regulator 33 for the process air arriving from the compressed air source 30, which can preferably be remote controlled (for example one or more taps with adjustable opening). In the process air feed line 3, the process air is regulated to a first pressure P1. On the process air feed line 3 there is at least one intake valve 34 (preferably remote controlled). Thanks to the intake valve 34 it is possible to selectively activate or stop the process air inflow into the forming chamber 1 through the forming chamber 1 inlet 10. The intake valve 34 may be considered part of the means which stop the inflow of process air arriving from the compressed air source 30. In particular, the intake valve 34 may be considered an on-off valve of said stop means. The intake valve 34 may be located close to the forming chamber 1 inlet 10. The inlet 10 may be single or multiple, that is to say, having one or more openings and respective intake ducts. The belling machine comprises sealing elements 16 which cause at least partial pressurisation of at least one portion of the forming chamber 1 as the process air is introduced into the forming chamber 1. The sealing elements 16 are described in more detail below. The forming chamber 1 comprises shaped walls 11 designed to form the socket shape and against which the material of the end 20 of the pipe 2 is pushed by the process air introduced into said at least one portion of the forming chamber 1 which is at least partly pressurised. The shaped walls 11 are also described in more detail below. The forming chamber 1 may comprise an outer case 12 comprising an opening through which the end 20 of the pipe 2 on which a socket is to be formed is inserted (for example, as illustrated in FIG. 1). Alternatively, the forming chamber 1 may comprise an outer case 12 comprising two half-shells 12a, 12b which can be moved away from or towards each other so as to respectively release the end 20 of the pipe 2 or clamp down on it (for example, as illustrated in FIG. 3 or in FIG. 4). The belling machine also comprises means for cooling the end 20 of the pipe 2 which at least use the process air. The cooling means comprise a refrigerating machine 4 with an operating cycle operating on a refrigerant, the refrigerating machine 4 being equipped with a closed circuit for recirculating the refrigerant. The closed circuit for recirculating the refrigerant (labelled 42 in FIG. 1) in turn comprises a refrigerant evaporator 40 located along the path of the process air from the compressed air source 30 to the forming chamber 1. The process air feed line 3 conveys the process air into the evaporator 40, resulting in transfer of heat from the process air to the refrigerant inside the evaporator 40, thus cooling the process air. In this way, the refrigerating action of the refrigerating machine 4 is directly applied, inside the evaporator 40, to the process air which is then introduced into the forming chamber 1, allowing efficient cooling.

The cooled process air is then used to cool the end 20 of the pipe 2 formed into a socket in the forming chamber 1. In particular, the forming chamber 1 may comprise, in a suitable position, a process air outlet 14 on which an outlet valve 17 (preferably remote controlled) actively operates. After at least partial pressurisation of said at least one portion of the forming chamber 1 (during which the thrust of the process air caused socket forming on the end 20 of the pipe 2 against the shaped walls 11), outlet valve 17 opening is activated so that a flow of process air out of the forming chamber 1 is created. The flow of process air out of the forming chamber 1 is controlled in such a way that in said at least one portion of the forming chamber 1 which is at least partly pressurised, pressurisation is still maintained (although at a lower level than previously). The flow of process air out of the forming chamber 1 can be controlled using a flow regulator 77 (for example a flow rate regulator valve or tap), which is preferably remote controlled. Therefore, on the end 20 of the pipe 2, now formed into a socket shape, there is a continuously changed flow of cooled process air, which produces the desired reduction in the temperature of the end 20 of the pipe 2.

The evaporator 40 comprises inner ducts in which the refrigerant flows, around or adjacent to which, by means of suitable guide systems and/or respective ducts, the flow of process air is made to pass. The process air is preferably introduced into the evaporator 40 in such a way that its flow is against the flow of the refrigerant.

In the refrigerating machine 4 the refrigerant is subjected to a real thermodynamic cycle consisting of the same steps as an ideal cycle which, in literature, is known as "Rankine inverse cycle". The refrigerant is preferably of the halogenated hydrocarbon type. Along the closed circuit 42 for recirculating the refrigerant it is compressed by a compressor 43 and cooled in a condenser 44 to make it become liquid. It is then sent to an expansion element 45 (for example a throttle valve). In the expansion element 45 the pressure and temperature of the refrigerant are reduced. From the expansion element 45, the refrigerant is then sent to the evaporator 40, where it receives heat from the process air (conveyed there by the feed line 3), is returned to the gaseous state and is taken in again by the compressor 43. By way of not limiting example only, the construction configuration of the refrigerating machine 4 may be as follows. The compressor 43 may be a mechanical compressor, driven by an electric motor. The condenser 44 may be of the type with copper tubes having metal plate fins preferably made of aluminium (that is to say, of the "plate fin tube" type). The condenser 44 may use forced air cooling with an electric fan 46. The expansion element 45 is usually a throttle valve configured like a capillary tube. The evaporator 40 may be similar to a coaxial tube or shell and tube heat exchanger, with the mouth for entry of the process air to be cooled made in the shell.

In a preferred embodiment of the belling machine disclosed, the cooling means comprise a refrigerating section 5 which cools a heat exchange liquid recirculating in a respective closed circuit. The closed circuit for the heat exchange liquid (labelled 51 in FIG. 1) comprises a first heat exchanger 50, located on the process air feed line 3 upstream of the evaporator 40 relative to the forming chamber 1 along the process air path from the compressed air source 30 to the forming chamber 1. The process air feed line 3 conveys the process air into the first heat exchanger 50, resulting in transfer of heat from the process air to the heat exchange liquid and pre-cooling of the process air. The compressed air pre-cooled in this way is then sent to the evaporator 40 of the refrigerating machine 4, where process air cooling is completed.

The refrigerating section 5 may comprise a customary recirculating refrigerating unit 52, having refrigerating characteristics and capacity similar to those used for conventional belling machines. The heat exchange liquid which enters the first heat exchanger 50 has a temperature normally regulated between 7° C. and 15° C. The heat exchange liquid is preferably a solution of ethylene glycol in water. The first heat exchanger 50 is preferably of the tube bundle type. Around or adjacent to the inner ducts of the first heat exchanger 50 in which the heat exchange liquid flows, by means of suitable guide systems and/or respective ducts, the flow of process air is made to pass. The process air is preferably introduced into the first heat exchanger 50 in such a way that its flow is against that of the heat exchange liquid. The first heat exchanger 50 and the refrigerating unit 52 are sized so that the process air which enters the first heat exchanger 50 at a temperature of between 30° C. and 40° C. and at a pressure of 7 bar, upon exiting the first heat exchanger 50, is at a temperature preferably between 15° C. and 20° C. Thanks to subsequently passing inside the evaporator 40, the process air reaches an evaporator 40 outfeed temperature which is normally less than 8° C.

The combination of pre-cooling, obtained in the refrigerating section 5 heat exchanger 50, with the cooling produced in the refrigerating machine 4 evaporator 40 allows noticeably effective air cooling to be achieved, which produces surprising improvements in belling machine productivity, despite using substantially standard components and with a very low increase in costs compared with conventional cooling techniques. In particular, belling machines which, with the conventional system, guarantee productivity of around 200 cycles/hours, can be brought to a productivity of around 240 cycles/hours, with an increase in productivity of between 15% and 20%, against an increase in the overall costs for the machine of around 1%.

The sudden drop in the temperature of the process air before it is introduced into the forming chamber 1 may result in some condensation of the moisture in the air. Therefore, advantageously, the belling machine comprises a condensate collector 41, located on the process air feed line 3 immediately downstream of the evaporator 40 relative to the compressed air source 30 along the process air path from the compressed air source 30 to the forming chamber 1 and designed to collect the condensed moisture in the process air exiting the evaporator 40.

As is known, conventional belling machines usually comprise a refrigerating unit on the refrigerating section 5 (in whose heat exchanger the cooled heat exchange liquid circulates and the process air is made to pass). Therefore, to set up the embodiment of the invention which combines both the presence of the refrigerating machine 4 (which cools the process air) and the presence of the refrigerating section 5 (which pre-cools the process air), it is possible to easily modify an existing conventional belling machine, by adding the refrigerating machine 4 to it and inserting its evaporator 40 downstream of the heat exchanger belonging to the existing belling machine refrigerating unit. The refrigerating machine 4 to be inserted in this embodiment may easily be obtained by suitably modifying a suitably sized commercial refrigerating cycle compressed air dehumidifier. A refrigerating cycle compressed air dehumidifier is structured as follows: the compressed air to be dehumidified is introduced into a pre-cooling stage; from the pre-cooling stage the air is passed into the refrigerator evaporator which performs the cycle: the air cooled in this way passes through a condensate separator which removes the moisture from it and is then sent to a post-heating stage, after which it is again introduced into the compressed air network at the desired temperature. In some types of commercial dehumidifiers the pre-cooling stage and the post-heating stage are made in a single heat exchange element, which puts the air entering the dehumidifier in thermal contact with the air exiting the dehumidifier. The refrigerating machine 4 may therefore be made by taking a commercial dehumidifier, removing the pre-cooling and post-heating stages from the commercial dehumidifier, connecting to the inlet of the dehumidifier modified in this way a first branch of the process air feed line 3 arriving from the first heat exchanger 50 and connecting to the outlet of the dehumidifier modified in this way a second branch of the process air feed line 3 which is directed towards the forming chamber 1. The use of a commercial dehumidifier modified in this way also immediately makes available the condensate separator 41 downstream of the evaporator 40.

Advantageously, the belling machine comprises a stage 6 for enriching the process air with nebulised process water. The enriching stage 6 in turn comprises at least one nozzle 60, inserted in a stretch of the process air feed line 3 located downstream of the evaporator 40 relative to the compressed air source 30 along the process air path from the compressed air source 30 to the forming chamber 1. The nozzle 60 is oriented towards the side of the process air feed line 3 towards the forming chamber 1. It is preferably positioned coaxial with the stretch of feed line 3 in which it is inserted. The enriching stage 6 also comprises a pressurised water feed line 61, which takes water from a water source 62 and conveys it to the nozzle 60, where the water is nebulised in the process air flow. In the enriching stage 6 there are means 63 for stopping the inflow of process water to the nozzle 60, said means being positioned on the water feed line 61. The means 63 for stopping the inflow of process water to the nozzle 60, in particular, comprise one or more on-off valves. In the enriching stage 6 there are means 67 for regulating the flow rate of the process water inflow to the nozzle 60, said means being positioned on the water feed line 61. The water flow rate regulating means 67 comprise at least one flow rate or flow regulator (for example a tap with adjustable opening or a flow rate regulator valve). By acting on the stop means 63 it is possible to activate the water flow (preferably remotely), so that on command nebulised water can be introduced into the cooled process air flow which is moving towards the forming chamber 1. Said activation preferably takes place at the end of socket forming on the end 20 of the pipe 2, when the actual step of cooling the socket formed with a flow of process air begins.

Figure 2:
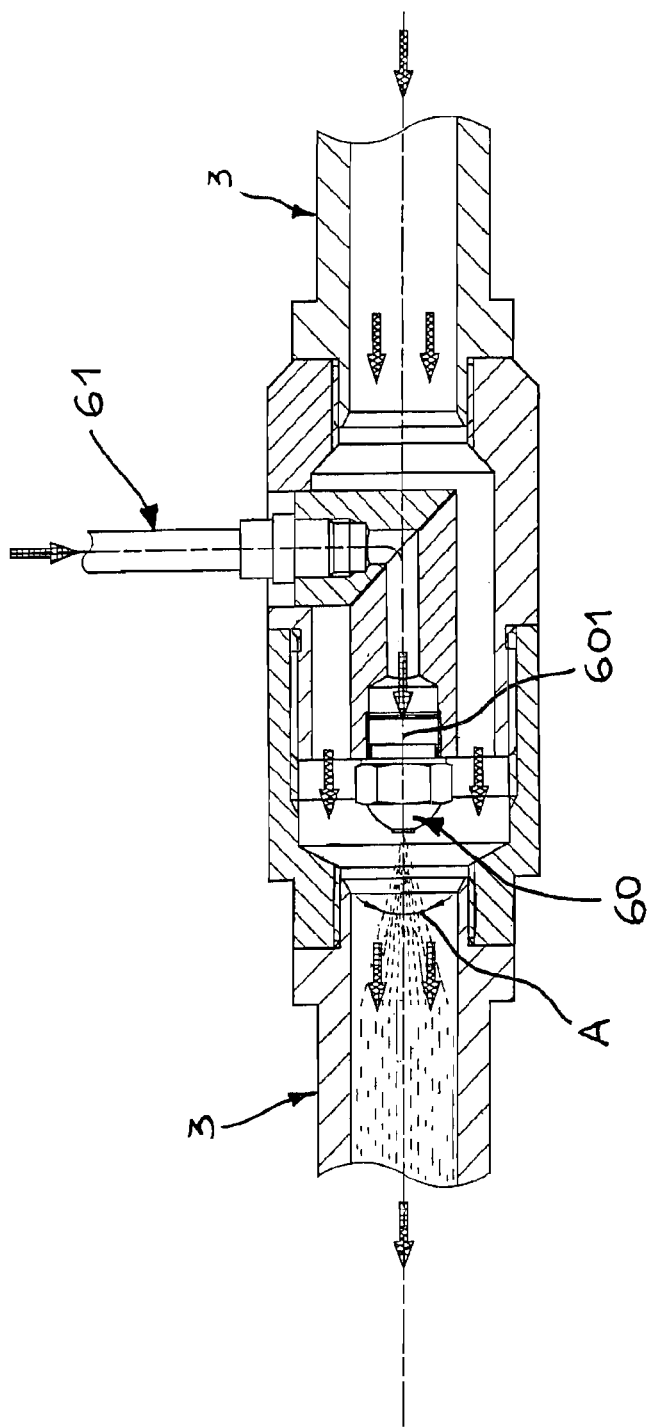
FIG. 2 shows a detail of the air treatment system, with a nozzle for nebulising water located inside the process air flow, illustrating the position of the nozzle inside the process air feed line and the geometry of the jet of nebulised water generated by it.

The cooling capability of the process air is greatly increased by the presence of finely nebulised water. Moreover, advantageously, the water exiting the nozzle 60 is finely dispersed inside a flow of cold air and is in turn cooled in an extremely effective way. The resulting air-water mixture therefore becomes an extremely efficient cooling fluid. The cooling capability of the air-water mixture is greater the more finely dispersed the water is in the compressed process air. The water is injected, at a pressure P4 which is higher than the pressure of the compressed air P1 in the feed line 3, into and at the centre of the feed line 3 duct in which the air flows and in the same direction as the air (FIG. 2). A particularly effective configuration is that in which (according to the geometry of the nozzle 60) dispersion of the nebulised water by the nozzle 60 forms a dispersion cone with a cone angle A which is less than or at most equal to 45°. Said value is preferably selected as being equal to 30°.

Advantageously, the belling machine comprises a stage 64 for cooling the water located along the water feed line 61. In this way, the water which is dispersed in the process air is already at least partly pre-cooled. The water cooling stage 64 comprises a second heat exchanger 65, mounted in a respective closed circuit in which a cooled heat exchange liquid recirculates. Advantageously, the heat exchange liquid comes from the same refrigerating section 5 and recirculates on a circuit branch (labelled 53 in FIG. 1) in parallel with the circuit branch (labelled 51 in FIG. 1) which serves the first heat exchanger 50. The second heat exchanger 65 is also preferably of the tube bundle type. Around or adjacent to the inner ducts of the second heat exchanger 65 in which the heat exchange liquid flows, by means of suitable guide systems and/or respective ducts, the flow of water arriving from the water source 62 is made to pass. The water is preferably introduced into the second heat exchanger 65 in such a way that its flow is against that of the heat exchange liquid.

Figure 4:
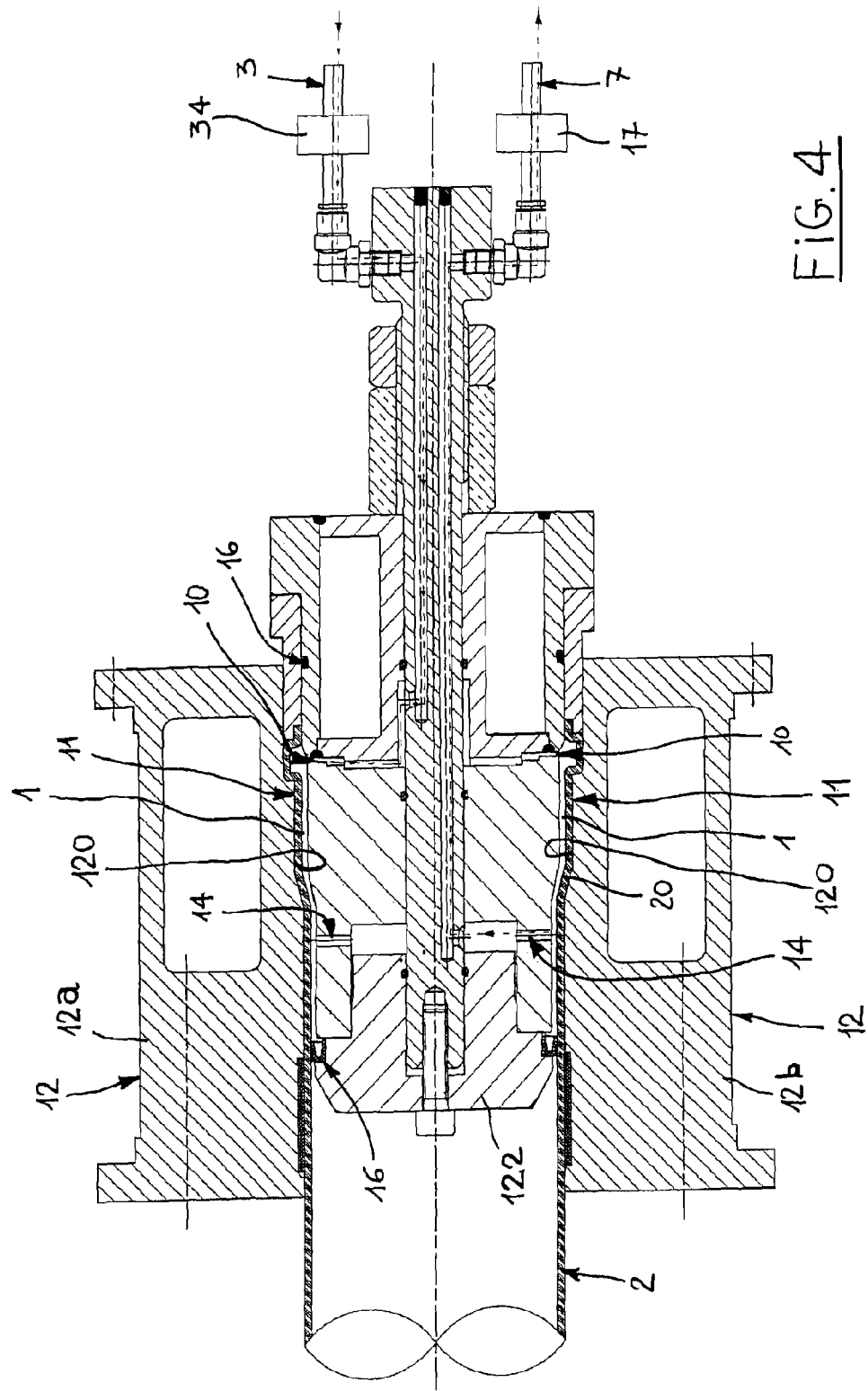
FIG. 4 is a cross-section of the schematic detail of another, further embodiment of the belling machine forming chamber in accordance with the invention.

In an embodiment of the invention schematically illustrated in FIG. 4, the shaped walls 11 form only the outer shape of the socket. In this case they are made by shaping inner walls 120 of the case 12. In this case, the process air inlet 10 into the forming chamber 1 must be located in such a way that the compressed process air arriving from the feed line 3 can inflate the end 20 of the pipe 2 from the inside, pushing its walls against the inner walls 120 of the case 12. In the embodiment illustrated in FIG. 4, inside the case 12 a centring spindle 122 is illustrated, having the function of an element simply for centring the pipe 2 relative to the case 12 and an element for supporting seals which, being part of the sealing means 16, guarantee the hermetic seal of the forming chamber 1 which is created between the centring spindle 122 and the inner walls of the pipe 2. The centring spindle 122 has no socket forming function.

In an embodiment illustrated in FIGS. 1 and 3, the forming chamber 1 is formed by a combination of the case 12 and a forming mandrel 13 located inside the case 12. The heated end 20 of the pipe 2 will be forced axially onto the forming mandrel 13. Outer lateral walls 130 of the forming mandrel 13 at least partly form the shaped walls 11 of the forming chamber 1 and are designed to form the inner shape of the socket to be formed.

In the embodiment illustrated in FIG. 1, the shaped walls 11 consist exclusively of the outer lateral walls 130 of the forming mandrel 13 and they only form the inner shape of the socket. In this case a socket is formed at the end 20 of the pipe 2 by the thrust of the process air applied on the outside of the end 20 of the pipe 2, pushing it against the outer lateral walls 130 of the forming mandrel 13. In this case the process air inlet 10 into the forming chamber 1 is positioned in such a way as to allow the thrust from the outside of the end 20 of the pipe 2 towards the inside. In particular, the inlet 10 may be located at the walls of the case 12. Between the inlet 10 and the forming mandrel 13 there may be a diffuser 18 which allows the process air flow to be evenly distributed on the end 20 of the pipe 2.

The case 12 may comprise two half-shells which close on each other and on the body of the pipe 2 like the jaws of a clamp (similarly to what is illustrated in FIGS. 3 and 4 for the half-shells 12*a* and 12*b*, although relating to two different embodiments of the forming chamber 1). In this case between one half-shell and the other and between each half-shell and the pipe 2 there must be sealing elements 16 which allow forming chamber 1 pressurisation to be guaranteed where necessary (the possible example positioning of such sealing elements 16—for example in the form of seals of various shapes and materials—is illustrated, although with reference to another two embodiments of the forming chamber 1, in FIGS. 3 and 4 which, for this purpose, may also relate to the case describe here).

With reference to FIG. 1, the case 12 may comprise a front opening 121, on which there is a flexible circular ring-shaped seal 160, in whose central hole the pipe 2 must be inserted in a sealed fashion; said seal 160 adheres to flat walls 161 of a contact device which is part of the belling machine.

In the embodiment illustrated in FIG. 3, the shaped walls 11 comprise both the inner walls 120 of the case 12 (which form the outer shape of the socket), and the outer lateral walls 130 of the forming mandrel 13 (which, in turn, form the inner shape of the socket). For the socket, the inner walls 120 of the case 12 form an outer shape having a diameter slightly greater than that of the final socket desired. In this case the inlet 10 has at least two branches, each served by a respective intake valve 34: a first branch, extending from a first branch 31 of the process air feed line 3 and leading into a zone of the forming chamber 1 which remains between the outer surface of the end 20 of the pipe 2 and the inner surface 120 of the case 2; a second branch, extending from a second branch 32 of the process air feed line 3 and leading into a zone of the forming chamber 1 which remains between the inner surface of the end 20 of the pipe 2 and the outer lateral surface of the forming mandrel 13. When the first branch of the inlet 10 is activated, the process air pushes the end 20 of the pipe 2 towards the outer lateral walls 130 of the forming mandrel 13. The upper half of FIG. 3 illustrates this condition of the end 20 of the pipe 2. When the second branch of the inlet 10 is activated, the process air pushes the end 20 of the pipe 2 towards the inner walls 120 of the case 2. The lower half of FIG. 3 illustrates this condition of the end 20 of the pipe 2.

In the embodiments of the forming chamber 1 comprising the presence of the forming mandrel 13, advantageously the belling machine comprises a stretch of process air conveyor line 7 which takes process air from the forming chamber 1 through an outlet 14 and, through a point of introduction 15, introduces the process air taken in this way into the forming mandrel 13 to cool the forming mandrel 13. The outlet 14 may also be divided into two or more branches. Each branch may be the extension of a respective stretch of conveyor line 7. Each branch may be served by a respective outlet valve 17. In the presence of the conveyor line 7, each time the outlet valve 17 is activated a process air flow out of the forming chamber 1 is created which penetrates the inside of the forming mandrel 13 and passes through it, exiting into the environment through suitable holes made in the forming mandrel 13. The path of the process air in the conveyor line 7 and in the mandrel is clearly shown in the example embodiment illustrated in FIG. 1. A similar path can be adopted in the example in FIG. 3. Advantageously the belling machine comprises a stage 70 for cooling the process air located along the process air conveyor line 7 between the forming chamber 1 outlet 14 and the point of introduction 15 of the air into the forming mandrel 13. In this way the process air, taken from the forming chamber 1 and already heated to a certain extent by contact with the material of the end 20 of the pipe 2, can be introduced into the forming mandrel 13 at a suitably low temperature to increase the cooling effect on the forming mandrel 13. The cooling stage 70 for the process air fed out of the forming chamber 1 comprises a third heat exchanger 72, mounted in a respective closed circuit in which a cooled heat exchange liquid recirculates. Advantageously, the heat exchange liquid comes from the same refrigerating section 5 and recirculates on a circuit branch (labelled 54 in FIG. 1) in parallel with the circuit branch (labelled 51 in FIG. 1) which serves the first heat exchanger 50 (and, preferably, where present, also in parallel with the circuit branch—labelled 53 in FIG. 1—which serves the second heat exchanger 65). The third heat exchanger 72 is also preferably of the tube bundle type. Around or adjacent to the inner ducts of the third heat exchanger 72 in which the heat exchange liquid flows, by means of suitable guide systems and/or respective ducts, the flow of process air arriving from the forming chamber 1 along the conveyor line 7 is made to pass. The process air is preferably introduced into the third heat exchanger 72 in such a way that its flow is against that of the heat exchange liquid.

The belling machine also preferably comprises a condensate separator device 71 located along the process air conveyor line 7 between the forming chamber 1 outlet 14 and the point of introduction 15 of the air into the forming mandrel 13, and acting on the process air to remove any water present from the process air. This prevents passage of water and/or moisture and/or the formation of condensate in the forming mandrel 13, where there may be mechanical elements. This step is particularly important when the process air which exits the forming chamber 1 is the type which was enriched with nebulised water in the enriching stage 6.

The present invention also relates to a method of forming a socket at the end of a pipe made of thermoplastic material.

Preferably, the method is implemented by a belling machine according to any of the various embodiments described above.

In the context of the following description, what was described above relative to the belling machine components, their operation and relationships to each other generally speaking also applies to the relative steps of the method, in particular where the steps of the method correspond to operation of the various parts of the belling machine described above.

The method of forming a socket at the end of a pipe made of thermoplastic material in accordance with the invention in general comprises the following steps:

taking a pipe 2 made of thermoplastic material having an end 20 heated to a plastically deformable state;

forming a socket with the material of the heated end 20 of the pipe 2;

taking process air arriving from a compressed air source 30 and subjecting the process air taken in this way to a treatment step which comprises at least one cooling sub-step;

cooling the material of the end 20 of the pipe 2 at least by means of a process air flow exiting the treatment step.

During the cooling sub-step, the process air is conveyed and made to pass inside an evaporator 40 of a refrigerating machine 4 with an operating cycle operating on a refrigerant, which recirculates in a respective closed circuit of the refrigerating machine 4 comprising the evaporator 40, resulting in transfer of heat from the process air to the refrigerant inside the evaporator 40.

In this way, the refrigerating action of the refrigerating machine 4 is directly applied, inside the evaporator 40, to the process air which is then sent to the end 20 of the pipe 2, making air cooling extremely efficient.

The end 20 of the pipe 2 may be heated beforehand in a suitable oven of the known type. As is also indicated below in the continued description of the method, socket forming may be carried out in a forming chamber 1 according to one of the embodiments described above. The compressed air source 30 and the means for conveying the process air from the compressed air source 30 to the socket forming point (in particular to the forming chamber 1) may be the same as those described relative to the belling machine (in particular the process air feed line 3, for which it is possible to use, according to requirements, the technical features and various embodiments indicated in the description of the belling machine), with their methods of operation already described (in particular relative to the various different embodiments of the belling machine described).

During the cooling sub-step of the process air treatment step, obviously the refrigerating machine 4 already described to indicate the features of the belling machine can be used, according to the same operating methods (in particular, using the same cycle and the same refrigerant). Obviously, the advantages and effects mentioned in that context may all also refer to the method in accordance with the invention.

Advantageously, in the process air treatment step:

the process air taken from the compressed air source 30 is first subjected to a pre-cooling sub-step, then to the cooling sub-step;

during the pre-cooling sub-step the process air is conveyed and made to pass in a first heat exchanger 50, in which the process air transfers heat to a heat exchange liquid which is cooled by a refrigerating section 5, the heat exchange liquid recirculating in a respective closed circuit comprising the first heat exchanger 50.

Obviously, the above-mentioned refrigerating section 5 may be that described above relative to the belling machine, like the first heat exchanger 50, the relative recirculating closed circuits and the type of heat exchange liquid. The particular way in which they are used may be immediately inferred from the part of the description relating to the belling machine which refers to them. As already described for the belling machine, the combination, during the process air treatment step, of the cooling step, carried out in the evaporator 40, with the pre-cooling sub-step, now described, allows significant cooling effectiveness to be achieved and considerable improvements in productivity with a minimal increase in costs.

Appropriately, during the process air treatment step, the process air exiting the evaporator 40 is subjected to a sub-step of collecting the condensed moisture in it, present because of the cooling. As already indicated, this allows a reduction or elimination of the condensate from the moisture content of the process air, which may be created following sudden lowering of the temperature of the process air during the pre-cooling and cooling sub-steps. This may be achieved with the condensate collector 41 described above and located in the same position of the air feed line 3 relative to the evaporator 40 and to the compressed air source 30.

The step of forming a socket on the heated end 20 of the pipe 2 comprises the sub-steps of:

inserting the heated end 20 of the pipe 2 in a forming chamber 1 equipped with shaped walls 11 designed to form the socket shape;

introducing into the forming chamber 1 the process air exiting the treatment step and pressurising at least one portion of the forming chamber 1, until a socket forming pressure is reached in said at least one portion of the forming chamber 1;

maintaining the socket forming pressure for a socket forming time.

The process air pressurised in this way pushes the material of the heated end 20 of the pipe 2 against the shaped surfaces 11 so that the end 20 of the pipe 2 takes on their shape. The process air, pushing the material of the end 20 of the pipe 2 against the shaped walls 11, as well as carrying out the forming action already begins initial cooling of the plastic material.

Obviously, the introduction of the process air into the forming chamber 1 to pressurise the latter may be achieved by means of an inflow of air through the inlet 10, acting on the intake valve 34. With regard to this, reference should be made to what has already been described relative to the belling machine.

The forming chamber 1 may be made in any of the ways described above with reference to the belling machine. In particular, it comprises the case 12. In an embodiment of the method, the forming chamber 1 is of the type schematically illustrated in FIG. 4 (and discussed in detail in the description of the corresponding embodiment for the belling machine), in which the shaped walls 11 form only the outer shape of the socket and therefore are made by shaping the inner walls 120 of the case 12. In this case, for the duration of the socket forming time the process air pushes from the inside of the end 20 of the pipe 2 towards the outside, pressing the material of the end 20 of the pipe 2 against the inner walls 120 of the case 12. Reference should be made to everything already said about the belling machine, in particular relating to the embodiment illustrated in FIG. 4.

In an embodiment of the method, with reference to the embodiments of the forming chamber 1 illustrated in FIGS. 1 and 3 (and described in detail in the description of the corresponding embodiments for the belling machine), the forming chamber 1 is formed by a combination of the outer case 12 and the forming mandrel 13 located inside the case 12. The outer lateral walls 130 of the forming mandrel 13 constitute a first part of the shaped walls 11 of the forming chamber 1 which forms the inner shape of the socket to be formed. In this case, the sub-step of inserting the heated end 20 of the pipe 2 in the forming chamber 1 comprises axially forcing the heated end 20 of the pipe 2 onto the forming mandrel 13. At least for a fraction of the socket forming time the process air, maintained at the socket forming pressure, presses the end 20 of the pipe 2 onto the outer lateral walls 130 of the forming mandrel 13. Again in this case, reference should be made to what has already been said in the description of the belling machine, in particular relating to the embodiments in FIGS. 1 and 3.

In particular, in the case in FIG. 1, in which the shaped walls 11 coincide with the outer lateral walls 130 of the forming mandrel 13 (the case 12 not having any mould function), the process air, maintained at the socket forming pressure, presses the end 20 of the pipe 2 onto the outer lateral walls 130 of the forming mandrel 13 for the entire socket forming time.

In the case in FIG. 3, as already said in the description of the belling machine, the outer case 12 has inner walls 120, constituting a second part of the shaped walls 11 of the forming chamber 1 which forms the outer shape of the socket to be formed. In this case, for a first part of the socket forming time the process air is introduced between the outer lateral walls 130 of the forming mandrel 13 and the end 20 of the pipe 2, pushing the end 20 of the pipe 2 so that it presses against the inner walls 120 of the outer case 12 (see, in particular, the lower half of FIG. 3). In the space between the outer lateral walls 130 of the forming mandrel 13 and the end 20 of the pipe 2 the socket forming pressure is maintained at a first value for the duration of the first part of the socket forming time. When the first part of the socket forming time has ended, after at least partial depressurisation of the space between the outer lateral walls 130 of the forming mandrel 13 and the end 20 of the pipe 2, for a second part of the socket forming time the process air is introduced into the space between the walls 120 of the outer case 12 and the end 20 of the pipe 2, pushing the end 20 of the pipe 2 so that it presses against the outer lateral walls 130 of the forming mandrel 13 (see, in particular, the upper half of FIG. 3). In the space between the inner walls 120 of the outer case 12 and the end 20 of the pipe 2 the socket forming pressure is maintained at a second value for the duration of the second part of the socket forming time. For the duration of the first part of the socket forming time the socket forming pressure may be equal to that maintained during the second part of the socket forming time. The socket forming pressure maintained during the first socket forming time is usually higher than that maintained during the second part of the socket forming time.

At the end of the socket forming time, the step of cooling the material of the end 20 of the pipe 2 comprises:

allowing an outflow of process air from the forming chamber 1 which is less than the inflow of process air into the forming chamber 1, so that, at a pressure lower than the socket forming pressure, in the forming chamber 1 a flow of continuously changed process air is established on the material of the end 20 of the pipe 2;

maintaining both the outflow of process air from the forming chamber 1 and the inflow of process air into the forming chamber 1 for a cooling time.

The outflow of process air from the chamber 1 may be obtained by means of the process air outlet 14 from the forming chamber 1, by acting on the outlet valve 17. With regard to this, reference should be made to what has already been described relative to the belling machine.

In the embodiments of the forming method involving the use of a forming chamber 1 equipped with a forming mandrel 13 (whose features and embodiments are also described in detail in the part of the description relating to the belling machine), like those illustrated in FIGS. 1 and 3, the method comprises taking process air flowing out of the forming chamber 1 and introducing it into the forming mandrel 13, so as to cool the forming mandrel 13. This may be done with any of the technical solutions for this purpose described with reference to the belling machine. In particular, from the process air outlet 14 from the forming chamber 1, by acting on the outlet valve 17, it is possible to make the air pass through the stretch of conveyor line 7 as far as the point of introduction 15 into the forming mandrel 13. With regard to this, reference should be made to what has already been described relative to the belling machine.

Desirably, before being introduced into the forming mandrel 13, the process air flowing out of the forming chamber 1 is subjected to a post-treatment step which comprises at least one relative cooling sub-step. This cooling sub-step of the process air post-treatment step may be carried out in the cooling stage 70 for the process air fed out of the forming chamber 1 by means of the conveyor line 7, as indicated in detail in the description of the corresponding parts of the belling machine (obviously with the same effects and advantages). In particular reference is also made here to the use of the third heat exchanger 72 and its link to the refrigerating section 5, as described relative to the belling machine.

For more efficient cooling of the end 20 of the pipe 2 already formed into a socket, advantageously the process air treatment step comprises the activation, after the relative cooling sub-step, of a sub-step of enriching the process air with pressurised nebulised water which in turn comprises the following steps:

taking water from a water source 62;

allowing an inflow of the water at a predetermined pressure into at least one nozzle 60 which nebulises the water and disperses it in the process air.

Desirably, the predetermined water pressure is higher than the process air pressure where the nebulised water is dispersed in the process air. This aspect is described below.

The air treated in this way is then sent onto the material of the end 20 of the pipe 2 (in particular in the forming chamber 1). The sub-step of enriching the process air with pressurised nebulised water may be carried out by means of the enriching stage 6 already described with reference to the belling machine. In this case the inflow of water into the nozzle 60 is obtained using the water feed line 61. As already described relative to the belling machine, the nozzle 60 is located with is axis 601 coinciding with the direction of flow of the process air at the point where the nozzle 60 is immersed in said flow. The geometric configuration of the nozzle 60 is such that during the sub-step of enriching the process air with pressurised nebulised water the outfeed cone of pressurised nebulised water from the nozzle 60 has a cone angle A which is less than or equal to 45°. The cone angle A is preferably equal to 30°. Reference should be made to everything already said about the enriching stage 6 in the description of the belling machine. Reference should also be made to all of the observations made about the cooling capability of the mixture of process air and nebulised water. It should be noticed that the nebulised water is injected in the same direction as the air flow at a pressure P4 higher than the pressure P1 of the process air inside and at the centre of the duct (that is to say, the stretch of process air feed line 3) in which the process air flows. A process parameter which is crucial for achieving an optimum cooling capability of the fluid obtained (the air-water mixture) is the flow rate of the flow of nebulised water injected, a flow rate which must be regulated based on the flow rate of the process air flow at the point of injection. The flow rate of the flow of nebulised water can be regulated using the means 67 for regulating the inflow of water into the nozzle 60, previously described relative to the belling machine. An excessive water flow rate may result in excessive enlargement of the drops of water dispersed in the process air. Such enlargement compromises the heat exchange between the water and the process air. That makes cooling of the water particles by the cold process air into which they are injected less efficient. It also tends to create a rain effect on the plastic material of the socket, reducing the cooling capability compared with that which could be achieved by maintaining the water dispersed in the process air in a "cloud" state.

During the sub-step of enriching the process air with pressurised nebulised water, the pressurised water taken from the water source 62, before being sent to the nozzle 60, is cooled in a cooling stage 64. The cooling stage 64 may have all of the characteristics and embodiments described above with reference to the belling machine. In particular reference is also made here to the use of the second heat exchanger 65 and its link to the refrigerating section 5, as described relative to the belling machine.

In cases in which forming a socket on the end 20 of the pipe 2 involves the use of a forming chamber 1 according to any of its embodiments, the above-mentioned sub-step of enriching the process air with pressurised nebulised water is activated at the end of the socket forming time and only during the time for cooling the material of the end 20 of the pipe 2. This is useful for preventing the material of the end 20 of the pipe 2 from making contact with the water (even if it is in a finely dispersed form) when it is still hot enough to be damaged by such contact.

Advantageously, in cases in which in the forming chamber 1 there is a forming mandrel 13 (and, in particular, in cases involving activation of the sub-step of enriching the process air with pressurised nebulised water), before being introduced into the forming mandrel 13, the process air is subjected to a condensate separation process to eliminate any water present in the process air. This process may be carried out using the condensate separator 71, located along the process air conveyor line 7, already described relative to the belling machine. Reference should be made to all of its operating methods and features described.

Appropriately, in cases in which the sub-step of enriching the process air with pressurised nebulised water was activated, it is interrupted at the end of the time for cooling the material of the end 20 of the pipe 2, whilst both the outflow of process air from the forming chamber 1 and the inflow of process air into the forming chamber 1 are continued. In this way, in the forming chamber 1 a continuously changed flow of process air is established to dry the forming chamber 1 and the end 20 of the pipe 2. This condition is maintained during a further interval of time after the cooling time. This further interval of time serves to eliminate from the forming chamber 1 and from the end 20 of the pipe 2 the traces of water which could have remained there. In this way, it is possible to remove from the forming chamber 1 an end 20 of the pipe 2 with a socket formed on it which is dry and, at the same, to have the forming chamber 1 ready and already free of contamination, for the insertion of the end 20 of another pipe 2 and to perform another operating cycle.

In FIGS. 1 to 4, the paths of the process air (along the process air feed line 3 and/or along the conveyor line 7), the heat exchange liquid (on the various branches of the recirculating circuit to the refrigerating section 5), and the refrigerant in the refrigerating machine 4, are illustrated with respective arrows and (where present) with respective continuous lines.

Implementation of the method disclosed is now briefly described with reference, by way of example and without any way limiting the scope of the invention, to operation of a preferred embodiment of a belling machine in accordance with the invention. In particular, the following is a description of a significant example of an effective operating cycle, applied to a belling machine which uses a mechanical plug (mandrel) for forming sockets on the ends of pipes made of PVC (polyvinyl chloride), and in this specific case, made of PVC-U. In particular, reference is made to the use of a belling machine having a forming chamber 1 of the type illustrated in FIG. 1 (that is to say, with the shaped walls 11 formed by the outer lateral walls 130 of the forming mandrel 13).

The end 20 of a pipe 2 (in particular made of PVC-U) is heated in an oven until it is in a deformable state. Then the forming mandrel 13 is forced axially into the end 20 of the pipe 2, enlarging the pipe 2 and pre-forming its end 20. At the same time, the end 20 of the pipe 2, like the forming mandrel 13, is inside the outer case 12 of the forming chamber 1.

Meanwhile, after the stop means have been opened, the process air feed line 3 takes air from the compressed air source 30 (for example, at a pressure of between 5 bar and 10 bar) and sends it to the devices which subject the process air to the treatment step. The process air treatment step is carried out as follows. First, the process air feed line 3 introduces the air to be treated into the first heat exchanger 50, where the air makes thermal contact with the heat exchange liquid (a solution of ethylene glycol in water) cooled by the refrigerating section 5. In this way the process air is subjected to the pre-cooling sub-step and, when it exits the first heat exchanger 50, the air is sent (by means of the air feed line 3) to the evaporator 40 of the refrigerating machine 4. Here the process air makes thermal contact with the refrigerating machine 4 refrigerant and so is subjected to the cooling sub-step. Due to the sizing of the refrigerating devices, when it exits the evaporator 40, the process air has adopted a stable low temperature value (which may be between 5° C. and 10° C., preferably equal to 6° C. or 8° C.). In this state, when it exits the evaporator 40, the process air encounters the condensate collector 41. In the latter the process air is subjected to the sub-step of collecting condensed moisture which may have formed in the process air due to the lowering of its temperature. The condensed water is collected in a condensate collector 41 cup and from there discharged using a suitable valve. The process air, now cooled and dehumidified, in the air feed line 3 is brought to the first pressure P1 (equal to around 6 bar in this example), then passes the stage 6 for enriching the process air with nebulised water (which for the moment is kept inactive), for the moment completing the treatment step and being sent to the forming chamber 1, where the end 20 of the pipe 2 is fitted on the forming mandrel 13. With the outfeed valve 17 closed, the intake valve 34 is opened and the process air is introduced into the forming chamber 1 through the inlet 10. Thanks to the action of the sealing elements 16, the forming chamber 1 is pressurised to the socket forming pressure (equal to around the first pressure P1, which in this example is 6 bar). The socket forming pressure is maintained for the socket forming time, allowing the process air to push the material of the end 20 of the pipe 2 against the outer lateral surfaces 130 of the forming mandrel 13, which form the shaped walls 11 and the inner shape of the socket. During the socket forming time, contact with the process air (initially cold) located inside the forming chamber 1 produces a first, slight lowering of the temperature of the end 20 of the pipe 2. At the end of the socket forming time, the step of cooling the material of the end 20 of the pipe 2 using a flow of cooled process air is started. Keeping the intake valve 34 open, the outfeed valve 17 is also opened and opening of the outflow flow regulator 77 is regulated so that the forming chamber 1 is only partly depressurised and a balance is established (between the outflow of process air from the forming chamber through the outlet 14 and the inflow, through the inlet 10, of cooled process air arriving from the treatment step) which establishes in the forming chamber 1 a second pressure P2, equal to a maintenance pressure for maintaining the pressurised state in conditions in which the cooled compressed air is continuously circulating. Usually, when the compressed air being fed in is at a pressure of 6 bar (equal to the first pressure P1), the second pressure P2, equal to the maintenance pressure, is set at around 4 bar. This creates a resulting pressure for the flow of process air out of the forming chamber 1 (and, therefore, in the conveyor line 7) equal to a third pressure P3, given by the difference between the first and second pressures P1 and P2. Given the pressures of this example, the third pressure P3 is therefore equal to around 2 bar. The more the outflow flow regulator 77 is open, the lower the pressure is inside the forming chamber 1 and, therefore, the lower the residual forming effect is. However, at the same time, the flow rate of the convective process air flow established in the forming chamber 1 is correspondingly greater and, therefore, the cooling effect on the end 20 of the pipe 2 is correspondingly greater. This condition is maintained for the cooling time.

At the end of the socket forming time and at the start of the cooling time, operation of the stage 6 for enriching the process air with nebulised water is activated, starting, in the process air treatment step, the sub-step of enriching it with nebulised water. After the means 63 which stop the inflow of process water to the nozzle 60 have been opened, the water feed line 61 takes water from the water source 60 and sends its to the water cooling stage 64. Upon entering the second heat exchanger 65, the water makes thermal contact with the heat exchange liquid cooled by the refrigerating section 5 and recirculating in the circuit branch labelled 53 in FIG. 1. When it exits the second heat exchanger 65, the water cooled in this way is sent to the nozzle 60 with a pressure regulated to a fourth pressure P4 which is higher than the first pressure P1 of the process air in the stretch 31 of air feed line where the nozzle 60 is located.

The construction configuration of the nozzle 60 is selected in such a way that the cone angle A of the water emission cone from the nozzle 60 is preferably equal to around 30°. The flow rate of water inflow to the nozzle 60 is regulated (for example by the regulating means 67) in such a way that the water is so finely dispersed in the process air that, once it has entered the forming chamber 1 conveyed by the air, there is no "rain effect" on the end 20 of the pipe 2 or on the various parts of the forming chamber 1.

In this way the process water is introduced into the process air flow in the form of extremely fine particles which, as well as being conveyed effectively, are immediately further cooled by the process air and very rapidly reach the same temperature as the process air. The mixture of process air and nebulised water obtained in this way is then introduced into the forming chamber 1 through the inlet 10, flows on the end 20 of the pipe 2 cooling it very effectively and rapidly and is then expelled from the forming chamber 1 through the outlet 14, being introduced into the conveyor line 7.

The process air (whatever its state: dry or containing nebulised water collected in the enriching stage 6) which, heated by the contact with the end 20 of the pipe 2, exits the chamber 1 through the outlet 14, is introduced into the conveyor line 7 which conveys it towards the point of introduction 15 into the forming mandrel 13. Before entering the forming mandrel 13, where it helps to cool the latter, the process air is subjected to the post-treatment step. In particular, the conveyor line 7 conveys the process air to the process air cooling stage 70, introducing it into the third heat exchanger 72, where it makes thermal contact with the heat exchange liquid cooled by the refrigerating section 5 and recirculating in the circuit branch labelled 54 in FIG. 1. Having been subjected in this way to the cooling sub-step of the post-treatment step, the process air which has been cooled again, upon exiting the third heat exchanger 72, is introduced into the condensate separator 71 by the conveyor line 7. In this way, the water present in the process air (either due to its residual moisture, or its mixing with nebulised water in the enriching stage 6) is eliminated and the air, having been dehumidified again, can be introduced into the forming mandrel 13 without any risk that its inner mechanical elements may be damaged or compromised. Having entered the forming mandrel 13 through the point of introduction 15, the process air passes through it (preferably moving along the longitudinal axis X of the forming mandrel 13), exiting into the environment through holes suitably made in the forming mandrel 13 (for example in the front 131 part of the mandrel).

The invention brings important advantages.

The cooling process is rendered extremely rapid and efficient. The ratio of increased productivity (in particular the increase in the number of operating cycles in a unit of time) to increased costs necessary in order to implement the invention is extremely favourable.

Approximately: a conventional belling machine for PVC-U pipes, in normal environmental conditions (ambient temperature of 23° C.), achieves a compressed air temperature downstream of the treatment step equal to 16° C. To achieve this result, the conventional machine uses in the forming and cooling process compressed air taken from the network at a pressure of 7 bar with a flow rate of 5000 Nl/min and cooled by a normal refrigerating system having a capacity of 6000 units of refrigeration/hour (and in which the heat exchange liquid is kept at a temperature of 11° C.). The belling machine and the method disclosed allow compressed air to be obtained at the forming chamber 1 inlet which, after the treatment step (and before mixing with nebulised water), has a stable temperature of around 6° C. and a moisture content corresponding to a dew point of 3° C. in the compressed air at 7 bar. This result, based on the invention, can be obtained in particular by adding to the conventional refrigerator with a capacity of 6000 units of refrigeration/hour, a refrigerating machine having a compression refrigerating cycle which absorbs 0.7 kW of electricity, therefore with a minimal increase in costs and system complexity.

What is claimed is:

1. A belling machine for forming sockets on the ends of pipes made of thermoplastic material, comprising:
   a forming chamber, for the insertion and forming of a socket on the heated end of a pipe made of thermoplastic material on which a socket is to be formed;
   a process air feed line, taking the process air from a compressed air source and introducing the process air into the forming chamber through an inlet;
   cooling means for cooling the end of the pipe comprising a refrigerating machine with an operating cycle operating on a refrigerant, the refrigerating machine being equipped with a closed circuit for recirculating the refrigerant which in turn comprises a refrigerant evaporator located along a path of the process air from the compressed air source to the forming chamber;
   wherein the process air feed line conveys the process air into the evaporator, resulting in transfer of heat from the process air to the refrigerant inside the evaporator, thus cooling the process air;
   said cooling means further comprising a refrigerating section which cools a heat exchange liquid recirculating in a respective closed circuit, the closed circuit of the heat exchange liquid comprising a first heat exchanger, located on the process air feed line upstream of the evaporator relative to the forming chamber along the process air path from the compressed air source to the forming chamber, the process air feed line conveying the process air into the first heat exchanger, resulting in transfer of heat from the process air to the heat exchange liquid and pre-cooling of the process air.

2. The belling machine according to claim 1, comprising a condensate collector, located on the process air feed line immediately downstream of the evaporator relative to the compressed air source along the process air path from the compressed air source to the forming chamber and designed to collect the condensed moisture in the process air exiting the evaporator.

3. The belling machine according to claim 1, comprising a stage for enriching the process air with nebulised process water, the stage for enriching the process air with nebulised process water in turn comprising:
   at least one nozzle, inserted in a stretch of the process air feed line located downstream of the evaporator relative to the compressed air source along the process air path from the compressed air source to the forming chamber;
   a water feed line, taking water from a water source and conveying it to the nozzle, where the water is nebulised in the process air flow;
   means for stopping the inflow of process water to the nozzle, said means being positioned on the water feed line;
the nozzle being oriented towards the side of the process air feed line towards the forming chamber.

4. The belling machine according to claim 3, comprising a water cooling stage located along the water feed line.

5. The belling machine according to claim 1, comprising sealing means which cause at least partial pressurisation of at least one portion of the forming chamber as the process air is introduced into the forming chamber,
   wherein the forming chamber comprises shaped walls designed to form the socket shape and against which the material of the end of the pipe is pushed by the process air introduced into said at least one portion of the forming chamber which is at least partly pressurised.

6. The belling machine according to claim 5, wherein the forming chamber is formed by a combination of a case and a forming mandrel located inside the case and onto which the heated end of the pipe will be forced axially, outer lateral walls of the forming mandrel at least partly forming the shaped walls of the forming chamber and being designed to form the inner shape of the socket to be formed; the belling machine comprising a stretch of process air conveyor line which takes process air from the forming chamber through an outlet and, through a point of introduction, introduces the process air taken in this way into the forming mandrel so as to cool the forming mandrel.

7. The belling machine according to claim 6, comprising a process air cooling stage located along the process air conveyor line between the forming chamber outlet and the point of introduction of the air into the forming mandrel.

8. The belling machine according to claim 6, comprising a condensate separator device located along the process air conveyor line between the forming chamber outlet and the point of re-introduction of the air into the forming mandrel, and acting on the process air to remove any water present from the process air.

* * * * *